(12) United States Patent
Mangolini et al.

(10) Patent No.: US 10,084,184 B2
(45) Date of Patent: Sep. 25, 2018

(54) CONFORMAL COATING OF NANO-POROUS MATERIAL WITH GROUP IV SEMICONDUCTOR USING NANOPARTICLE INK

(71) Applicant: The Regents of The University of California, Oakland, CA (US)

(72) Inventors: Lorenzo Mangolini, Yorba Linda, CA (US); Lanlan Zhong, Santa Clara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/243,845

(22) Filed: Apr. 2, 2014

(65) Prior Publication Data

US 2014/0295269 A1    Oct. 2, 2014

Related U.S. Application Data

(60) Provisional application No. 61/807,615, filed on Apr. 2, 2013.

(51) Int. Cl.

| H01M 4/36 | (2006.01) |
|---|---|
| H01M 4/1395 | (2010.01) |
| H01M 4/60 | (2006.01) |
| H01M 4/04 | (2006.01) |
| H01M 4/38 | (2006.01) |
| H01M 4/62 | (2006.01) |
| H01M 4/134 | (2010.01) |
| H01M 10/0525 | (2010.01) |

(52) U.S. Cl.
CPC ......... *H01M 4/366* (2013.01); *H01M 4/0402* (2013.01); *H01M 4/0471* (2013.01); *H01M 4/134* (2013.01); *H01M 4/1395* (2013.01); *H01M 4/386* (2013.01); *H01M 4/625* (2013.01); *H01M 10/0525* (2013.01); *H01M 2220/20* (2013.01); *H01M 2220/30* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| 6,531,100 | B1* | 3/2003 | Ogata | B01J 35/002 |
|---|---|---|---|---|
| | | | | 422/177 |
| 2005/0087726 | A1* | 4/2005 | Anazawa | B82Y 30/00 |
| | | | | 252/500 |
| 2005/0266162 | A1* | 12/2005 | Luo | B82Y 30/00 |
| | | | | 427/180 |
| 2008/0241047 | A1* | 10/2008 | Asano | B82Y 10/00 |
| | | | | 423/414 |
| 2014/0302396 | A1* | 10/2014 | Lu | C01B 31/36 |
| | | | | 429/231.8 |

FOREIGN PATENT DOCUMENTS

WO    WO2012044068    *    4/2012

* cited by examiner

*Primary Examiner* — Ladan Mohaddes
(74) *Attorney, Agent, or Firm* — Schwegman Lundberg & Woessner, P.A.

(57) ABSTRACT

A nanostructured composite material includes a substrate, a porous layer including a highly structured material, and a coating including nanoparticles. A method for forming the nanostructured composite material can include forming a porous layer on a substrate, the porous layer including a highly structured material, and applying nanoparticles to the porous layer to form the nanostructured composite material.

13 Claims, 6 Drawing Sheets

CONFORMAL COATING OF NANO-POROUS MATERIAL WITH GROUP IV SEMICONDUCTOR USING NANOPARTICLE INK

CLAIM OF PRIORITY

This application claims the benefit of U.S. Provisional Patent Application Ser. No. 61/807,615, filed on Apr. 2, 2013, which is incorporated by reference herein in its entirety.

TECHNICAL FIELD

The subject matter disclosed herein generally relates to nanostructured composite materials and, in particular, to nanostructured composite materials for use in energy devices.

BACKGROUND

Coating inner surfaces of high surface area layers can provide benefits in various industries, for example, in energy devices. Energy devices can be used in a variety of applications. There has been a demand for reducing the size and weight of consumer electronics industry such as portable electronic equipment and thus, the size and weight of energy devices used in portable electronic equipment. The realization of reducing the size and weight of portable electronic equipment relies partially on improvement of battery performance. To meet the demand, development and improvement of batteries from various aspects have been proceeding. Characteristics required of batteries include a high voltage, a high energy density, safety, and freedom of shape design.

Lithium ion batteries are widely used in consumer electronics industry because of, among other things, their lightweight, high energy capacity, and low self-discharge properties. However, for certain applications such as automotive applications, the development and improvement of properties of the lithium ion batteries continue.

OVERVIEW

As discussed herein, coating high surface area layers can provide benefits for energy devices. When used in an energy device, the high surface area layer can provide increased electrical conductivity and high contact area with an electrolyte in which the high surface area will be operating. The coating applied to the high surface area layer can be an active material. However, applying a uniform coating onto the high surface area layer can be difficult.

In the present disclosure, it has been demonstrated that the surface of high surface area layers (e.g., nanostructured layers) can be coated using a stable colloidal dispersion of nanoparticles functionalized using an appropriate ligand. In an example, the stable colloidal dispersion can include silicon nanoparticles functionalized using the appropriate ligand. For instance, carbon nanotube films can be coated with silicon nanoparticles to create high-capacity anodes for lithium ion batteries.

Silicon has been used as an anode material in previous approaches. However, silicon experiences large volume variations during battery charge/discharge resulting in pulverization of the active layer, which can lead to poor cycling ability and rapid capacity fading. Using nanostructured silicon can experience less mechanical stress upon lithium insertion/extraction and can prevent or limit the pulverization issue. In previous approaches, silicon nanowires and silicon nanotubes were investigated as potential anode materials. The silicon nanowires and nanotubes can be grown on conductive substrates. For example, coatings have been obtained using chemical vapor deposition (CVD) growth of silicon using a silane precursor in high-temperature, vacuum systems. However, this approach includes high manufacturing costs, which can prevent commercialization. Other previous approaches have attempted to include silicon nanoparticles into a conductive structure that uses materials such as graphene, carbon nanotubes, and carbon black. However, there must be effective contact between the silicon nanostructure and the conductive materials for this approach to be feasible.

As disclosed herein, a coating can be formed at room-temperature by drop casting a silicon-containing liquid or "ink" onto a porous layer (e.g., the nanostructured layer). The application of the coating using a liquid may be more material efficient than through gas application (e.g., using CVD) and may be compatible with high-production techniques such as various roll-to-roll coating technologies.

The present disclosure provides chemically treating a surface of both nanoparticles (e.g., silicon nanoparticles) and a nanostructured layer (e.g., a carbon nanotube layer) to form a nanostructure composite that includes a uniform coating of the nanoparticles on the nanostructured layer. The nanostructure composite can provide effective contact between the nanostructured layer and the nanoparticles and can be used as an anode material in lithium ion batteries. The nanostructure composite provides improved capacity and cycling stability over previous approaches.

This overview is intended to provide an overview of subject matter of the present patent application. It is not intended to provide an exclusive or exhaustive explanation of the invention. The detailed description is included to provide further information about the present patent application.

DETAILED DESCRIPTION

It has been demonstrated that the surface of nanostructured layers can be coated using a stable colloidal dispersion of silicon nanoparticles functionalized using an appropriate ligand. For instance, carbon nanotube films may be coated with silicon to create high-capacity anodes for lithium ion batteries.

The techniques discussed herein may be applicable to any of a variety of materials and liquid forms. In various examples, the porous layer may be any of a variety of highly structured materials, such as nanoparticles and nanotubes. In various examples, the liquid may be any of liquid silicon solution or a liquid silicon suspension or any of a variety of other materials and liquid forms. The resultant product may be utilized with respect to batteries or other suitable product applications.

Figure 1:
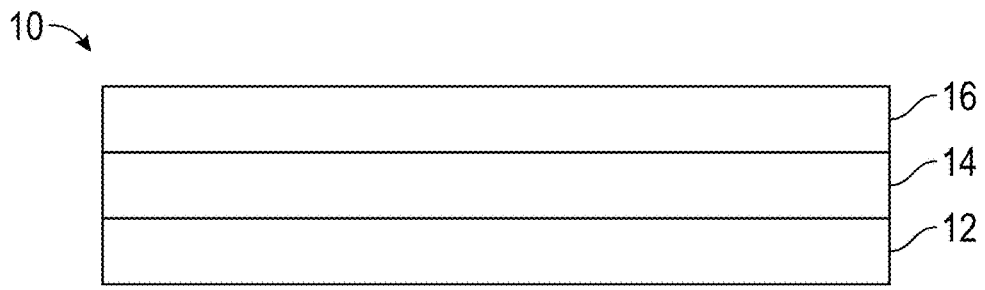
FIG. 1 illustrates generally a nanostructured composite material.

FIG. 1 illustrates generally a nanostructured composite material 10. The nanostructured composite material 10 can include a substrate 12, a porous layer 14, and a coating 16. The substrate 12 can be a conductive substrate chosen from copper, nickel, and aluminum. In an example, the substrate 12 is copper.

In an example, the porous layer 14 can be deposited onto the substrate 12. The porous layer 14 can include a highly structured material. In one example, the porous layer 14 can include nanotubes such as carbon nanotubes. In another example, the porous layer 14 can include graphene sheet. The highly structure material can increase the surface area of the porous layer 14. The increased surface area can assist in increasing electrical conductivity and increase the contact area with an electrolyte when the nanostructured composite material 10 is used in an energy device.

In an example, the coating 16 can be deposited onto the porous layer 14. The coating 16 can include nanoparticles. In an example, the nanoparticles can include silicon, tin, and germanium. In one example, the coating 16 includes silicon nanoparticles. The silicon nanoparticles can have an average diameter within a range of about 5 nanometers (nm) to about 15 nanometers. In an example, the average diameter of the silicon nanoparticles is about 5 nm. As discussed herein, uniformly applying the coating 16 to the porous layer 14 for providing effective contact between the silicon nanoparticle and the highly structured material. The techniques discussed herein may produce coatings that have a thickness variance that exceeds that which may be produced by CVD. In various examples, while CVD may, for instance, produce a film with a thickness of 5 nanometers plus-or-minus 1 nanometer, the liquid application process disclosed herein can leave a portion that is uncoated in parts (i.e., has zero thickness) while having 1 monolayer in certain parts and 2 or more monolayers in other parts. As discussed herein, nanostructured composite material 10 can be utilized with respect to batteries or other suitable product applications.

The nanostructured composite material 10 can have a weight ratio of the carbon nanotubes to the silicon nanoparticles within a range of 1:1 to about 1:50, for example, about 1:5 to about 1:40. In one example, the weight ratio of the carbon nanotubes to the silicon nanoparticles can be about 1:30.

Figure 2:
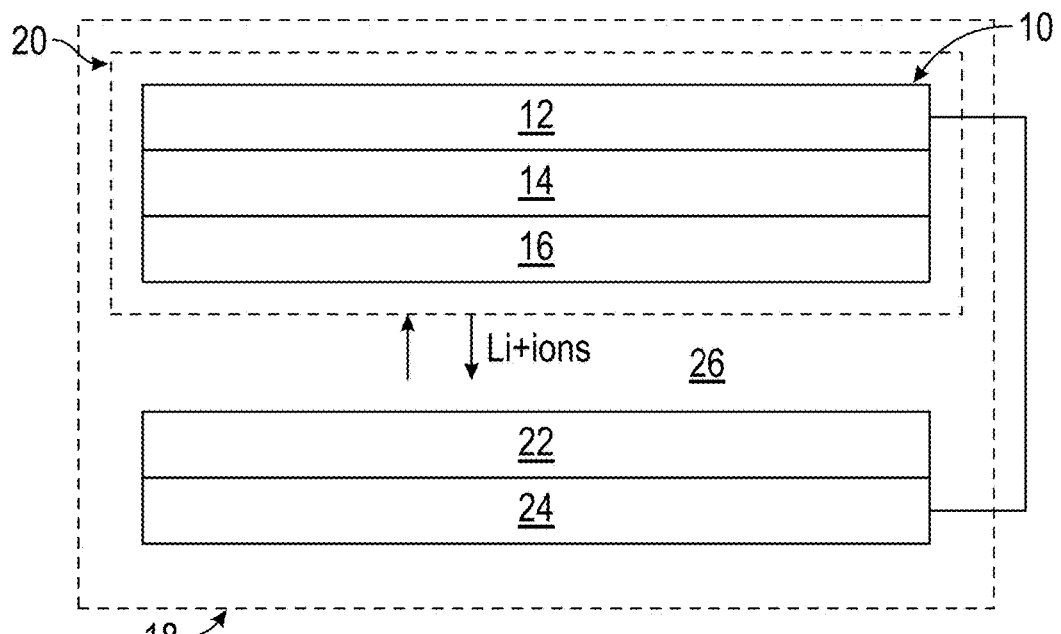
FIG. 2 illustrates generally a battery including the nanostructured composite material.

FIG. 2 illustrates generally a battery 18 (also referred to herein as "battery 18") including the nanostructured composite material 10. As shown in FIG. 2, the battery 18 can include an anode 20, a cathode 22, a current collector 24, an electrolyte 26. The anode 20 can include the nanostructured composite material 10 and include the substrate 12, the porous layer 14, and the coating 16, as discussed herein with respect to FIG. 1. The cathode 22 can be chosen from at least one of lithium, Li, lithium iron phosphate ($LiFePO_4$), lithium manganese oxide ($LiMnO_2$), and lithium cobalt oxide ($LiCoO_2$). In one example, the cathode 22 is lithium. In an example, the current collector 24 can include aluminum. Other current collector suitable for use in a lithium ion battery can be used.

The electrolyte 24 can include electrolytes suitable for use in a lithium ion battery can be used. The battery 18 can also include a separator positioned between the anode 20 and the cathode 22. The separator can include be a porous membrane, such as polyethylene (PE) membrane, polypropylene (PP) membrane, anodic aluminum oxide (AAO) template, block-co-polymer (BCP), and filter paper. Other porous membranes suitable for use in a lithium ion battery can be used.

Figure 3:
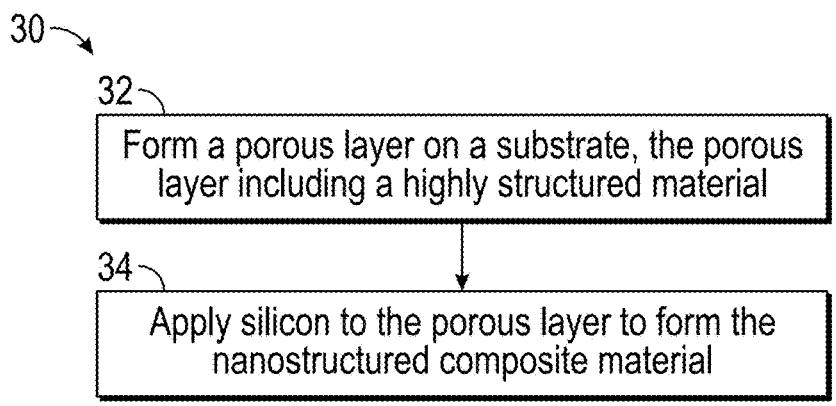
FIG. 3 illustrates generally a method of forming the nanostructured composite material.

FIG. 3 illustrates generally a method 30 of forming the nanostructured composite material. In an example, method 30, at step 32, can include forming a porous layer on a substrate, where the porous layer includes a highly structured material. For example, method 30 can include forming the porous layer 14 on the substrate 12, as discussed herein with respect to FIG. 1. In an example, method 30, at step 34, can include applying silicon to the porous layer to form the nanostructured composite material. For example, method 30 can apply silicon to the porous layer 14 to form the nanostructured composite material 10, which includes the coating 16 including silicon nanoparticles, as discussed herein with respect to FIG. 1.

The method 30 can further include modifying a surface of the carbon nanotubes to include a carboxylic acid group (—COOH). For example, the surface of the carbon nanotubes can be modified prior to forming the porous layer on the substrate. The carbon nanotubes can be treated with an acid to form the carboxylic acid group on the surface. Modifying the surface of the carbon nanotubes to include the carboxylic acid group can enhance the carbon nanotubes solubility in solvents and form a uniform coating with the silicon.

The method 30 can include applying a solution including the highly structured material to the substrate. For example, the highly structured material can be the carbon nanotubes having the modified surface. In an example, the solution can be a colloidal dispersion of the carbon nanotubes. In an example, the solution can be a liquid carbon nanotube solution or a liquid carbon nanotube suspension. The method 30 can include curing the solution including the highly structured material to form the porous layer such as porous layer 14 as illustrated in FIG. 1.

The method 30 can further include modifying a surface of the silicon to include an organic aliphatic chain prior to applying the silicon to the highly structured material. In an example, the surface of the silicon can be modified to include a 12 carbon long aliphatic chain. For example, the surface of the silicon can be modified prior to applying the silicon to the porous layer. The organic aliphatic chains were grafted on the surface of the silicon by refluxing the silicon nanoparticles with a solvent, for example, including 1-dodocene and mesitylene. After hydrosilylation, the silicon nanoparticles were separated by evaporating the solvent. Modifying the surface of the silicon particles can minimize oxidation and stabilizing the silicon nanoparticles in various solvents.

The method 30 can include applying a solution including the silicon to the substrate. For example, the silicon can include the silicon nanoparticles having the modified surface. In an example, the solution can be a colloidal dispersion of the silicon nanoparticles. In an example, the solution can be a liquid silicon solution or a liquid silicon suspension. The method 30 can include curing the solution including the silicon to form a conformal silicon film such as coating 16 (as shown in FIG. 1) on the porous layer such as porous layer 14 (as shown in FIG. 1).

As discussed herein, the nanostructured composite material formed by method 30 can include a weight ratio of the highly structured material to the silicon within a range of 1:1 to about 1:50. In an example, the nanostructured composite includes a weight ratio of the highly structured material to the silicon of about 1:30.

Figure 4:
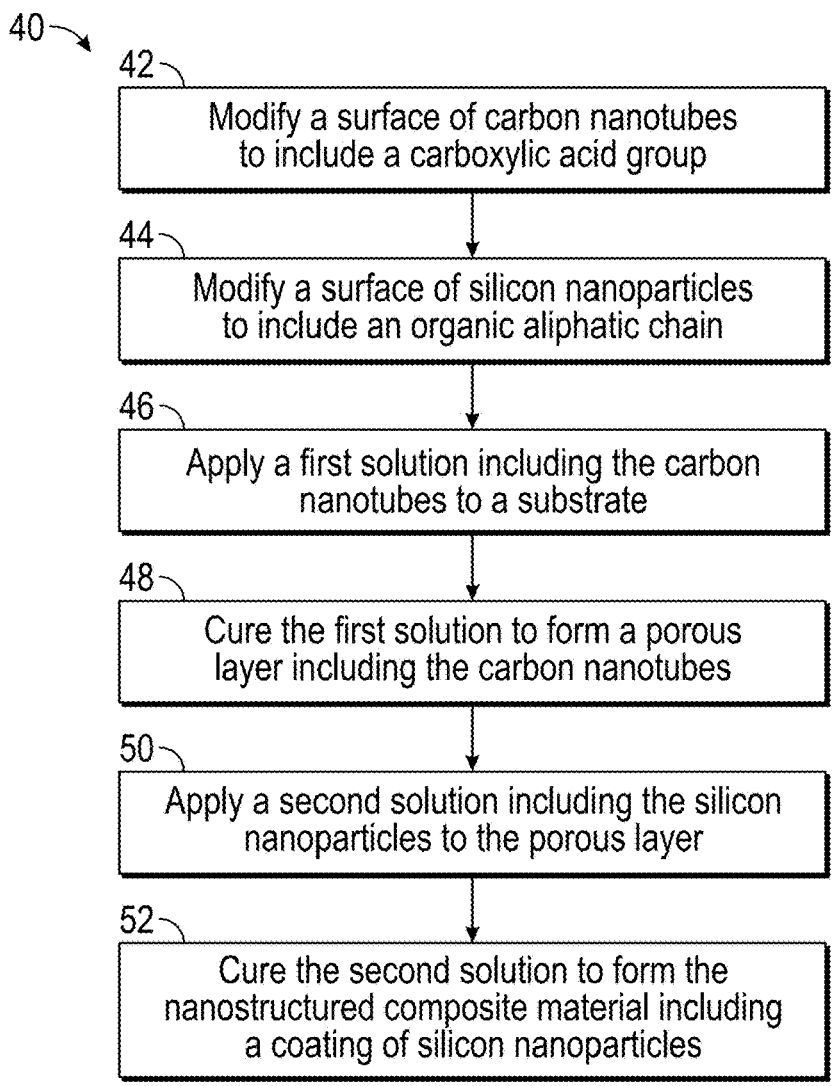
FIG. 4 illustrates generally a method of forming the nanostructured composite material.

FIG. 4 illustrates generally a method 40 of forming the nanostructured composite material. In an example, method 40, at step 42, can include modifying a surface of carbon nanotubes to include a carboxylic acid group. Method 40, at step 44, can include modifying a surface of silicon nanoparticles to include an organic aliphatic chain. Method 40, at step 46, can include applying a first solution including the carbon nanotubes to a substrate. Method 40, at step 48, can include curing the first solution to form a porous layer including the carbon nanotubes. Method 40, at step 50, can include applying a second solution including the silicon nanoparticles to the porous layer. Method 40, at step 53 can include curing the second solution to form the nanostructured composite including a coating of silicon particles.

Figure 5:
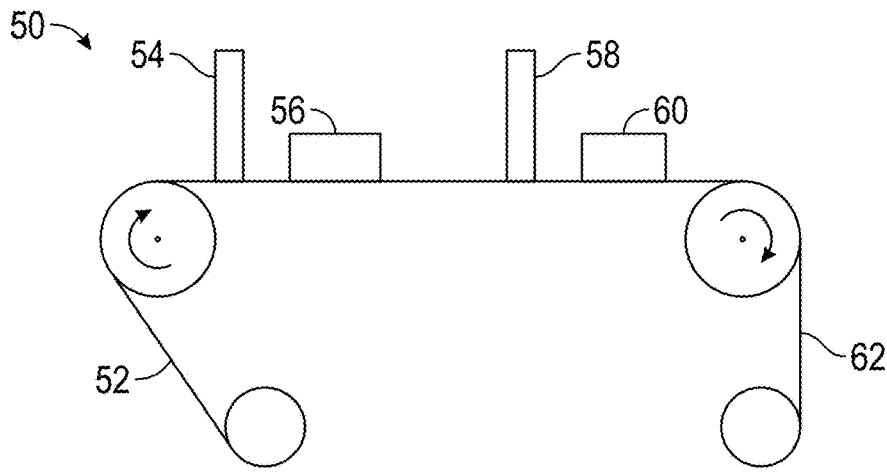
FIG. 5 illustrates generally a schematic representation of a system for the manufacture of the nanostructured composite material.

FIG. 5 illustrates generally a schematic representation of a system 50 for the manufacture of the nanostructured composite material. For example, system 50 can be used to form the nanostructured composite 10 (as shown in FIG. 1). For example, the system 50 can include a first slot die 54, a first flash lamp 56, a second slot die 58, and a second flash lamp 58. The first slot die 54 can include the first solution (e.g., nanotube-containing dispersion) including the carbon nanotubes having a modified surface. The first slot die 54 can drop cast the first solution onto the substrate 52 (e.g., a copper substrate). The substrate 52 and the first solution can pass under the first flash lamp 56 to remove the liquid and form the porous layer such as porous layer 14 (as shown in FIG. 1). The second slot die 56 can drop cast the second solution on to the porous layer. The second solution can include the silicon nanoparticle dispersion, where the silicon nanoparticles have the modified surface. Applying the second solution to the porous layer can create the coating of silicon nanoparticles onto the surface of the carbon nanotubes. The substrate including the porous layer and the second solution can pass under the second flash lamp 60 to remove any liquid and form the coating (e.g., coating 16 as shown in FIG. 1) onto the porous layer to form the nanostructured composite material.

As discussed herein, the nanostructured composite material includes a conformal coating on a porous layer including carbon nanotubes. The nanostructured composite can include a uniform coating and an effective contact between the carbon nanotubes and the silicon nanoparticles. The nanostructured composite can be used as an anode material in lithium ion batteries.

EXAMPLES

The following examples are given to illustrate, but not limit, the scope of the present disclosure.

Forming the Silicon Nanoparticles

Crystalline silicon quantum dots (e.g., silicon nanoparticles) with a uniform size distribution centered around 4 nm were synthesized though a plasma enhanced chemical vapor despot ion (PECVD) technique.

Surface Modification of the Silicon Nanoparticles

Figure 6:
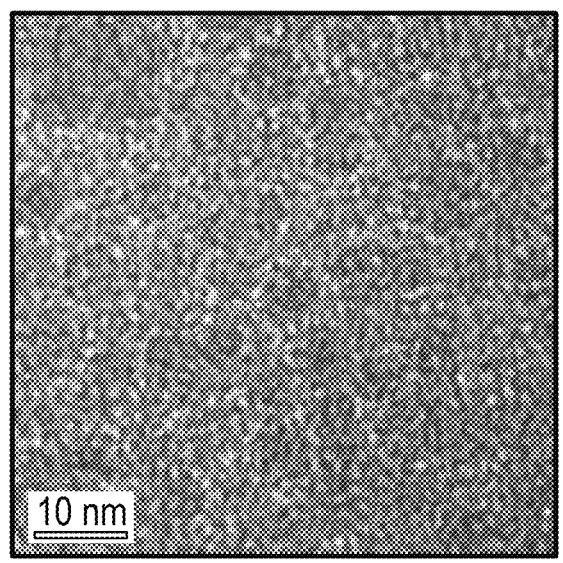
FIG. 6 illustrates a high magnification transmission electron microscopy (TEM) image of silicon nanoparticles.
Figure 7:
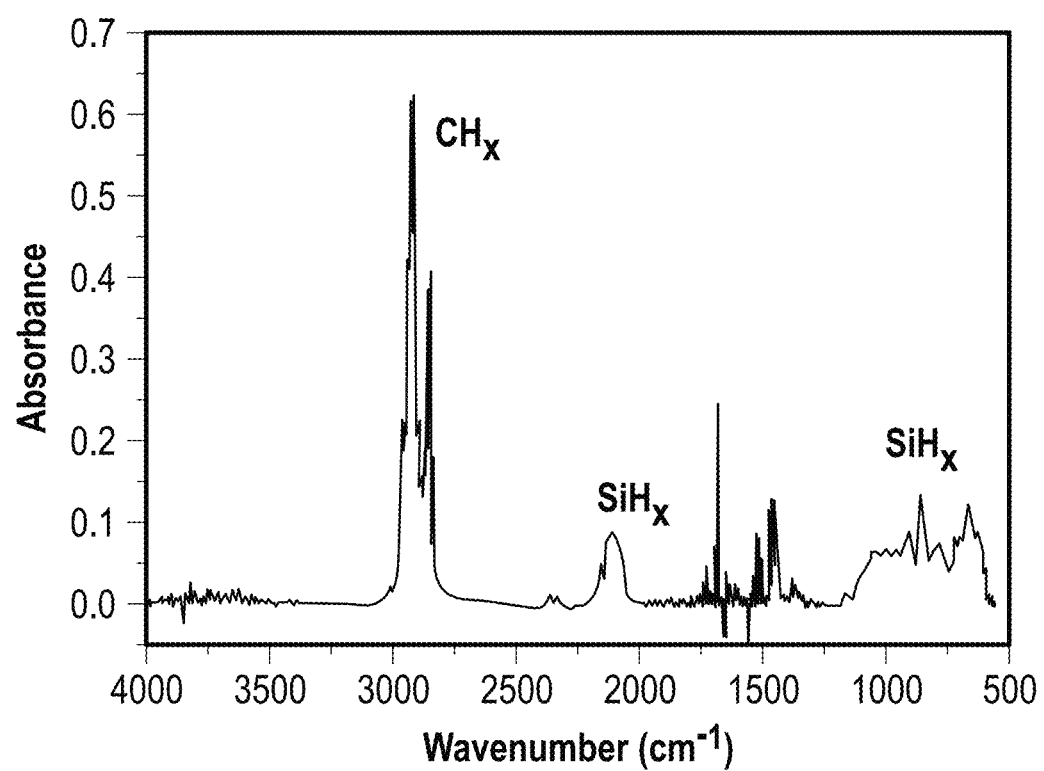
FIG. 7 illustrates the Fourier transform infrared spectroscopy (FTIR) of functionalized silicon nanoparticles.

Organic aliphatic chains were grafted on the surface of the synthesized nanoparticles by refluxing the silicon nanoparticles in a 1-dodocent/mestiylene (1:4 volume percent (%) ratio) mixture. The refluxing was allowed to continue for approximately 4 hours. After the hydrosilylation, the silicon nanoparticles were separated by evaporating the solvent with heat under vacuum. Fourier transform infrared spectroscopy (FTIR) was utilized to verify that the surface modification reaction was successful. FIG. 6 illustrates a high magnification transmission electron microscopy (TEM) image of the silicon nanoparticles. FIG. 7 illustrates the FTIR spectrum of the silicon nanoparticles having a modified surface (also referred to herein as "functionalized silicon nanoparticles"). As shown in FIG. 6, the produced silicon nanoparticles are crystallized and have an average diameter of about 5 nm. The FTIR shown in FIG. 7 illustrates surface bonds on wet-chemistry treated silicon nanoparticles. The FTIR sample was prepared by dispersing the surface modified silicon nanoparticles in chloroform, then dropping the colloidal dispersion on to the surface of an ATR ZnSe crystal. The $Si-H_x$ vibration peak around 2100 $cm^{-1}$ indicates the Si—H bond is not tally replaced. However, it is smaller compared to the $C-H_x$ peak vibration near 2900 $cm^{-1}$. The FTIR date, in addition to the fact that the functionalized silicon nanoparticles form a stable colloidal dispersion in toluene/chloroform/THF solvents, demonstrate that the 12-carbon long aliphatic chains are successfully grafted to the surface of the silicon nanoparticle surface.

Surface Modification of the Carbon Nanotubes

Multiwall carbon nanotubes were purchased form Sigma Aldrich. The carbon nanotubes were treated in a mixture of sulfuric acid and nitric acid (3:1 volume percent) for 45 minutes. The product (e.g., carbon nanotubes including carboxylic groups on the surface) was collected by filtration and washed with ethanol and dried in a vacuum.

Example 1

A first solution including the carbon nanotubes having a modified surface and 1-Methyl-2-pyrrolidone (NMP) (also referred to herein as "CNTs-NMP colloid) was formed. A second solution including the silicon nanoparticles and the toluene (also referred to herein as "SI NPs toluene colloid) was formed. The first solution was drop cast onto a copper substrate. The substrate and first solution were dried in a vacuum oven at 100 degrees Celsius for 12 hours to form the porous layer. The second solution was drop cast onto the porous layer and dried in a vacuum oven at 100 degrees Celsius for 12 hours to form the coating including silicon. The produce (e.g., nanostructured composite material) was baked at 500 degrees Celsius for 30 minutes under flowing argon gas. The resulting nanostructured composite material includes a weight ratio of the carbon nanotubes to the silicon nanoparticles is 1:1.

Figure 8:
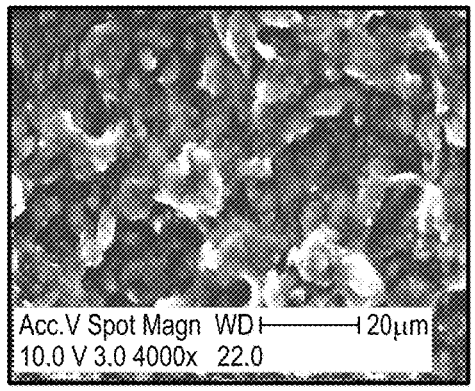
FIG. 8 illustrates a scanning electron microscopy (SEM) image of a nanostructured composite material.
Figure 9:
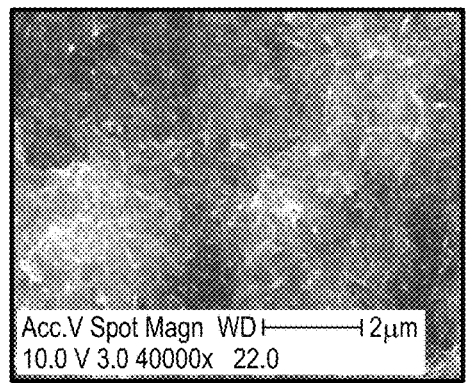
FIG. 9 illustrates a higher magnification SEM image of the nanostructure composite material shown in FIG. 8.

The topography and cross-sections were investigated with scanning electron microscopy (SEM) as shown in FIGS. 8 and 9. FIG. 8 illustrates the nanostructured composite material and FIG. 9 illustrates a higher magnification of FIG. 8. As compared to FIGS. 10 and 11, the nanostructured composite is relative porous and greatly increases the contact area, which can be beneficial to device functionality.

Half-cells (coin cell, parts purchased from MTI Co.) were constructed in an argon-filled glove box by using lithium foil as the counter electrode. 1 Molar LiPF6 in 1:1 v/v mixture of ethylene carbonate and diethyl carbonate was used as the electrolyte. The cells were discharge and charged with 0.1 C cycling current between 0.01 and 1.5 Volts using an Arbin battery test station. The discharge capacity is shown in FIG. 14 and the Coulombic efficiency is shown in FIG. 15.

Comparative Example A

Figure 11:
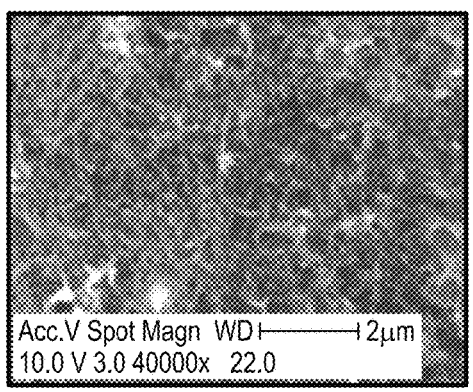
FIG. 11 illustrates an SEM image of carbon nanotubes on a copper substrate.

The carbon nanotube dispersion of Example 1 was drop casted onto the copper substrate and dried in a vacuum oven at 100 degrees Celsius for 12 hours and later baked at 500 degrees Celsius under flowing argon gas for 30 minutes. The topography was investigated with scanning electron microscopy (SEM) as shown in FIG. 11.

Figure 14:
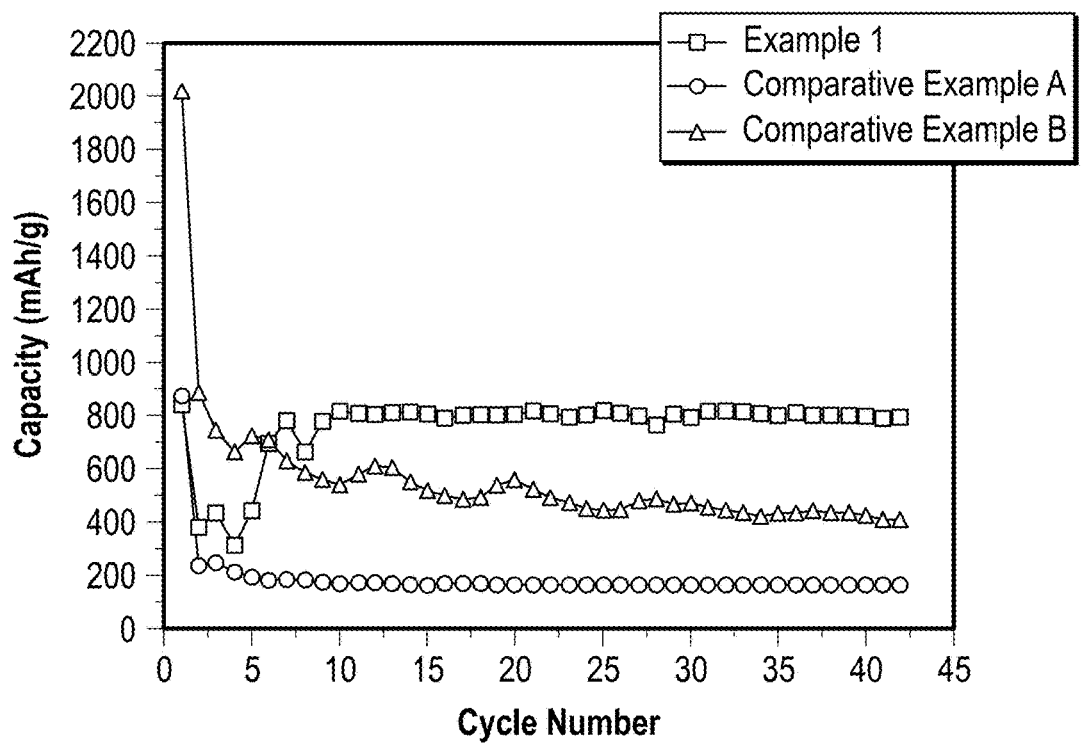
FIG. 14 illustrates the discharge capacity of Example 1, Comparative Example A, and Comparative Example B.
Figure 15:
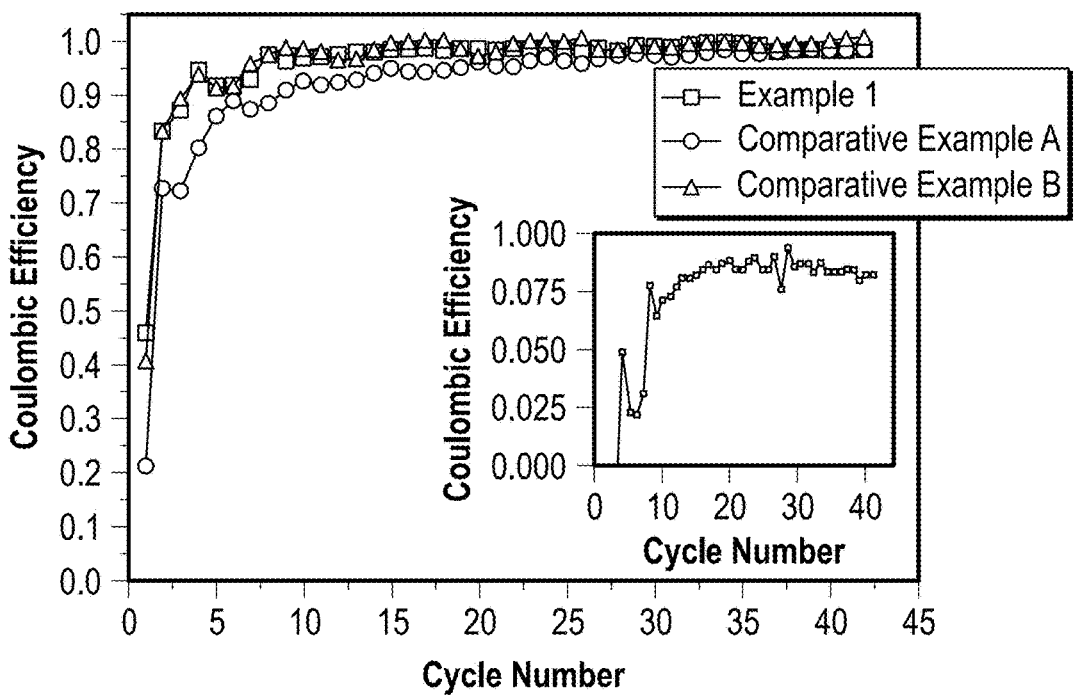
FIG. 15 illustrates the Coulombic efficiency of Example 1, Comparative Example A, and Comparative Example B.

Half-cells were formed as discussed in Example 1 and the discharge capacity is shown in FIG. 14 and the Coulombic efficiency is shown in FIG. 15.

Comparative Example B

Figure 10:
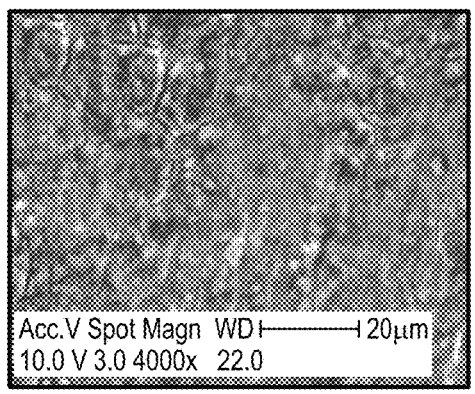
FIG. 10 illustrates a SEM image of silicon nanoparticles on a copper substrate.

The silicon nanoparticle dispersion of Example 1 was drop casted onto the copper substrate and dried in a vacuum oven at 100 degrees Celsius for 12 hours and later baked at 500 degrees Celsius under flowing argon gas for 30 minutes. The topography was investigated with scanning electron microscopy (SEM) as shown in FIG. 10.

Half-cells were formed as discussed in Example 1 and the discharge capacity is shown in FIG. 14 and the Coulombic efficiency is shown in FIG. 15.

Characterization of Example 1

Figure 12:
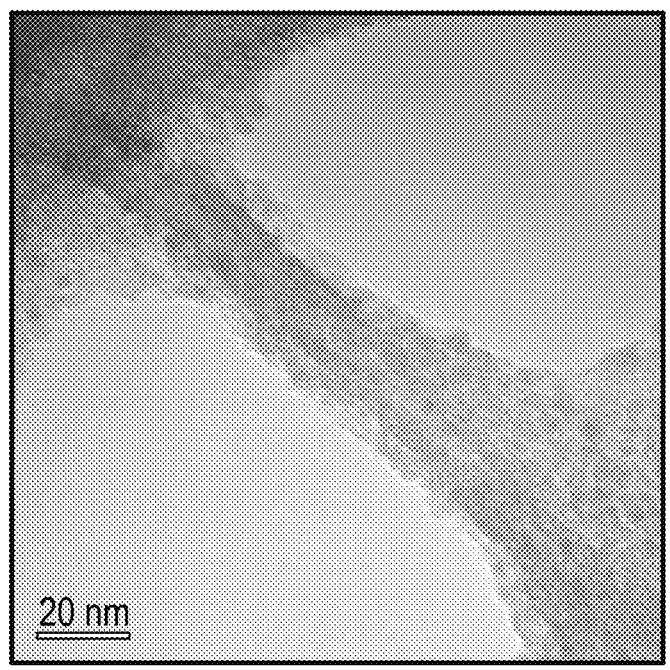
FIG. 12 illustrates a transmission electron microscopy (TEM) image of the nanostructure composite material.
Figure 13:
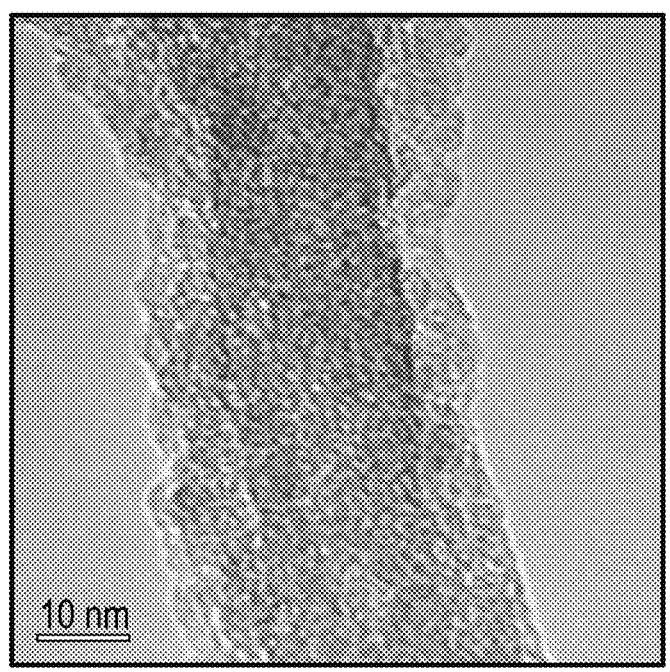
FIG. 13 illustrates a higher magnification of the TEM image of the nanostructure composite material in FIG. 12.

The nanostructure composite materials have been characterized by TEM. The samples were prepared by drop casting a dispersion of carbon nanotubes onto the TEM grid, drying the coating, and then drop casting a solution of silicon nanoparticles. As the nanoparticle layer dries, the particles adhere to the carbon nanotubes. FIG. 12 illustrates a TEM image of the nanostructure composite material and FIG. 13 illustrates a higher magnification of the TEM image of the nanostructure composite material in FIG. 12. FIGS. 12 and 13 shows that the silicon nanoparticles uniformly coat the carbon nanotube surface.

Results

FIG. 14 illustrates the discharge capacity of Example 1, Comparative Example A, and Comparative Example B. During the cycling test, the discharge current were 0.1 C calculated based on theoretical capacity and active materials weight in each cell. For Comparative Example A (including only carbon nanotubes), the first discharge capacity is about 871 mAh/g and decreased dramatically to an average of ~160 mAh/g in the following cycles. The lithium ions only bind on the surface, edges and defects of carbon nanotubes leading to its relatively low reversibly capacity. For Comparative Example B (including only silicon nanoparticles), the discharge capacity drops dramatically after initial cycle and slowly decay as cycling, which may be attribute to SEI formation and lose of contact to the current collector. For Example 1 (including the nanostructure composite material), the first discharge capacity is 835 mAh/g was achieved when normalized by the total mass of carbon nanotubes and silicon nanoparticles. The capacity dropped immediately following 3 cycles, most likely because of the SEI formation. However, discharge capacity increased back to ~810 mAh/g and was relatively stable afterwards. This indicates that the direct binding of the silicon nanoparticles to the current-conducting carbon nanotubes creates a structure with improved performance during electrochemical lithiation-delithiation.

FIG. 15 illustrates the Coulombic efficiency of Example 1, Comparative Example A, and Comparative Example B. Example 1, Comparative Example A, and Comparative Example B reach a Coulombic efficiency of greater than 98 percent after the first few cycles.

Various Notes

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the application, the terms "including" and "in which" are used as the plain-English equivalents of the respective terms "comprising" and "wherein." Also, in the following claims, the terms "including" and "comprising" are open-ended, that is, a method, a battery, or an energy device that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" should be interpreted to include not just 0.1% to 5%, inclusive, but also the individual values (e.g., 1%, 2%, 3%, and 4%) and the sub-ranges (e.g., 0.1% to 0.5%, 1.1% to 2.2%, 3.3% to 4.4%) within the indicated range. As used herein, the term "about" can be defined to include a margin of error, for example, at least +/−10%.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for forming a nanostructured composite material, comprising:
   modifying a surface of a highly structured material to include a carboxylic acid group;
   forming a porous layer on a substrate, the porous layer including the highly structured material;
   modifying a surface of silicon nanoparticles to include an organic aliphatic chain, the silicon nanoparticles having an average diameter within a range of 5 nanometer to 15 nanometers;
   applying the silicon nanoparticles having the organic aliphatic chain to the porous layer to form the nanostructured composite material;
   wherein the highly structured material includes carbon nanotubes.

2. The method of claim 1, wherein forming the porous layer includes applying a first solution including the highly structured material to the substrate.

3. The method of claim 2, further comprising curing the first solution to provide the porous layer.

4. The method of claim 1, wherein applying silicon to the porous layer includes applying a second solution including the silicon nanoparticles to the substrate.

5. The method of claim 4, wherein the second solution is a colloidal dispersion of the silicon nanoparticles.

6. The method of claim 4, wherein the second solution includes one of a liquid silicon solution and a liquid silicon suspension.

7. The method of claim 4, further comprising curing the second solution to form a conformal silicon film on the porous layer.

8. The method of claim 1, wherein the substrate includes copper.

9. The method of claim 1, wherein the nanostructured composite includes a weight ratio of the highly structured material to the silicon within a range of 1:1 to about 1:50.

10. The method of claim 1, wherein the nanostructured composite includes a weight ratio of the highly structured material to the silicon of about 1:30.

11. A method for forming a nanostructured composite material, comprising:
    modifying a surface of carbon nanotubes to include a carboxylic acid group;
    modifying a surface of silicon nanoparticles to include an organic aliphatic chain;
    applying a first solution including the carbon nanotubes to a substrate;
    curing the first solution to form a porous layer including the carbon nanotubes;
    applying a second solution including the silicon nanoparticles to the porous layer; and
    curing the second solution to form the nanostructured composite including a coating of silicon particles.

12. The method of claim 11, wherein the silicon nanoparticles have an average diameter of about five nanometers.

13. The method of claim 11, wherein a weight ratio of the carbon nanotubes to the silicon nanoparticles is within a range of 1:1 to about 1:50.

* * * * *